United States Patent Office 3,151,957
Patented Oct. 6, 1964

3,151,957
HYDROCARBON FUEL COMPOSITION OF
IMPROVED POUR POINT
Thomas J. Clough, Blue Island, and David W. Young,
Homewood, Ill., assignors to Sinclair Research, Inc.,
Wilmington, Del., a corporation of Delaware
No Drawing. Filed Feb. 13, 1962, Ser. No. 172,868
5 Claims. (Cl. 44—62)

This invention relates to a novel combination of additives for improving the pour point, and in many cases the cloud point of hydrocarbon fuel oils.

It is known in the art to add pour depressors to hydrocarbon fuels in order to permit their flow at low temperatures. Many different types of materials are known to depress the pour point of hydrocarbon fuel oils but usually have to be employed in disadvantageously large concentrations to provide the desired pour depression. We have now found that a combination of two different copolymer products when added in very small concentration to a hydrocarbon fuel oil results in a fuel oil composition of substantially reduced pour point. The results are particularly surprising in that one of the copolymers of the combination exhibits essentially no pour depressing properties by itself.

The copolymers of the combination of the present invention will hereinafter be referred to as Copolymer A and Copolymer B and will be discussed below under separate headings.

COPOLYMER A

Copolymer A of the combination of the present invention exhibits essentially no pour depressing properties by itself and is the oil-soluble copolymer of a lower alkyl aminoalkyl ester of a monoolefinic fatty acid of 3 to 4 carbon atoms having the general formula:

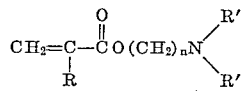

wherein R is selected from hydrogen and a methyl group, R' is selected from hydrogen and a lower alkyl group preferably an alkyl group of 1 to 4 carbon atoms, and $n$ is a number designating a lower alkylene radical, e.g. 1 to 2; and a long chain alkyl ester of a monoolefinic fatty acid of 3 to 4 carbon atoms having the general formula:

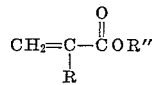

wherein R. is selected from hydrogen and a methyl group and R'' is an alkyl radical of a length sufficient to impart oil solubility to the copolymer. Generally R'' contains an average of at least 10 carbon atoms, susally 10 to 20 carbon atoms, preferably 12 to 18 carbon atoms.

The nitrogen-containing acrylate or methacrylate monomer can be prepared by any method known to the art as, for instance, by reacting acrylic acid or methacrylic acid with an alcohol having the general formula:

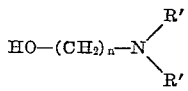

wherein $n$ is a number designating a lower alkylene radical, e.g. 1 to 2, and R' is selected from hydrogen and a lower alkyl group. Suitable examples of nitrogen-containing monomers reacted with the long chain alkyl acrylate or methacrylate are: N,N-dimethylaminoethyl methacrylate; N-methyl, N-butyl aminoethyl methacrylate; N-methylaminoethyl methacrylate; N,N-diethylamino ethylacrylate, N-propylaminoethyl acrylate, etc.

The long chain acrylate or methacrylate monomer copolymerized with the nitrogen-containing monomer to form Copolymer A of the present invention includes the esters of acrylic and methacrylic acids and long chain aliphatic alcohols, preferably alkanols of about 10 to 20 carbon atoms. Suitable long chain alcohols used in the esterfication are, for example decyl, lauryl, cetyl, stearyl, eicosamyl, nondecanyl and the like alcohols and mixtures thereof.

Copolymer A can be prepared by conventional bulk or dispersion polymerization methods involving known polymerization initiators. The proportions of the nitrogen containing monomer and long chain monomer employed in the copolymerization are such that the basic amino nitrogen content of the resulting copolymer will be in the range of about 1 to 5%, preferably 1 to 3 weight percent. In general, the proportions of nitrogen-containing compound to long chain acrylate or methacrylate employed will be about 1:3 to 1:20. Polymerization initiators particularly suited for use in preparing Copolymer A include various free-radical yielding catalysts as peroxide catalysts such as benzoyl peroxide, lauroyl peroxide, tertiary butyl peroxide, 2,2-bis(tertiary buytl peroxy) butane, di(tertiary butyl) peroxide, tertiary butyl perlargonate, hydrogen peroxide, sodium or potassium persulfate, percarbonate, peracetic acid and the like. Other suitable catalysts include sodium bisulfite, diethylsulfoxide, azo compounds such as alpha,alpha, azodiiso-butyro-nitrile and the like. The amount of the initiator added may vary over a considerable range. In general, the amount of initiator added will vary from about .01% to 5% by weight of the materials being polymerized. The temperature selected from the polymerization will vary depending on the polymerization method employed, the initiator and reactants selected, etc. but will generally be in the range from about 40° C. to 150° C. The kinematic viscosity of Copolymer A at 210° C. in a 40% solvent extratced Mid-Continent oil with viscosity index of 95–150 S.S.U. at 100° F. will generally fall in the range of about 175 to 400 centistokes, preferably about 200 to 350 centistokes. A particularly preferred copolymer is that formed by copolymerizing N,N-dimethylaminoethyl methacrylate and lauryl methacrylate in a ratio of about 1 to 9.

COPOLYMER B

Copolymer B of the present invention is an oil-soluble copolymer of isobutylene and a higher normal alpha-olefin of about 8 to 20 carbon atoms, preferably about 12 to 18 carbon atoms. Examples of suitable higher normal alpha-olefins include octene-1; decene-1; dodecene-1; cetene; octadecene 1; etc.

The copolymerization can be conducted at a temperature between about −90° F. and about +20° F., preferably between about −75° F. and 10° F., in the presence of a Friedel-Crafts catalyst employing about 25–75% by volume isobutylene and 25–75% by volume of the higher normal alpha olefin. These percentages are based on the total volume of the monomers. It is preferred that about 50% by volume of each monomer be employed. Although not absolutely necessary it is desirable to use an inert diluent for the catalyst and when used the proportion is generally about 0.5 to 5 volumes of diluent per volume of the mixed olefins. Suitable inert diluents include propane, butane, pentane, hexane as well as lower alkyl halides such as methyl chloride, ethyl chloride and the like. The preferred catalyst is a solution of aluminum chloride in ethyl chloride or methyl chloride, using a concentration of about 0.5 to 5% by weight of catalyst in the catalyst solution and about 0.1 to 15% by weight of total AlCl₃ catalyst per 100 parts of polymer formed.

After the desired copolymerization has been effected, either by batch or continuous operation, the resulting copolymer can be separated from residual catalyst by washing with water, alcohol, dilute aqueous caustic soda or other suitable hydrolyzing and washing medium. Copolymer B of the present invention is a light-colored, viscous oil copolymer having a Staudinger molecular weight of about 1000 to 20,000.

Copolymer additives A and B used in preparing the fuel compositions of this invention can be incorporated in the fuel oil by simply blending with stirring at ordinary temperature or, if desired, a mixture of the fuel and the copolymer additives can be heated to elevated temperatures, e.g. about 100–130° C. with agitation. Copolymers A and B are incorporated in amounts sufficient to reduce the pour point of the fuel, the total amount of A and B generally being up to about 0.5 or 1% and preferably at least about 0.1%. Usually at least about 0.02%, up to about 0.5% or more, preferably about 0.1 to 0.3, by weight of Copolymer A is employed. Copolymer B is usually employed in amounts of about 0.02 to 0.5% by weight or more, preferably about 0.05 to 0.25% by weight. The ratio of Copolymer B to Copolymer A will generally fall in the range of about 1 to 3:1.

The fuel oils which are improved in accordance with this invention are hydrocarbon fractions boiling primarily in the range of about 300° F. to 750° F. Such fuel oils are generally known as distillate fuel oils. It must be understood, however, that this term is not restricted to straight run distillates. These fuels can be straight run distillate fuel oils, catalytically or thermally cracked distillate fuel oils or mixtures of straight-run distillate fuel oils, naphthas and the like with cracked distillate stocks. The cracked materials will frequently be about 15 to 70 volume percent of the fuel. Moreover, such fuel oils can be treated in accordance with well known commercial methods such as acid or caustic treatment, solvent refining, clay treatment, etc.

The following examples are included to further illustrate the present invention.

*Example I*

One part of N,N'-dimethylaminoethyl methacrylate and nine parts of lauryl methacrylate were placed in a 1-neck flask and 0.5% of α,α-azodiisobutyronitrile was added as the polymerization catalyst. A slow stream of nitrogen was bubbled into the flask. The polymerization mixture was heated to 80° C. at which temperature an exothermic reaction occurred, and the temperature increased to about 130° C. Heating of the flask was discontinued until the temperature dropped back to 80° C. The reaction mixture was then held at 80° C. for four hours. The product was a viscous yellow liquid and was designated Copolymer A.

*Example II*

200 grams of powdered Dry Ice was added to a Dewar flask. To the flask was then added 175 gms. of isobutylene and 350 gms. of 1-octadecene. The Dry Ice present in the flask dropped the temperature to about −45° C. To these reactants was added approximately 500 ml. of n-hexane as an inert solvent in order to increase the temperature to −25° C. To these reactants was added at −25° C. a saturated solution of AlCl₃ in approximately 250 ml. of ethyl chloride, which was boiling at +12° C. On addition of this catalyst mixture the temperature in the reaction vessel rose to a maximum of −10° C. and was reduced immediately with the addition of powdered Dry Ice. The reaction temperature remained constant after the final addition of the catalyst mix, which took approximately 20 minutes. The product was stirred for one hour and washed with isopropyl alcohol. The product was then separated from the alcohol, and placed on a steam bath for 2 hours. The resulting product was designated Copolymer B.

*Example III*

A number of fuel oil blends with various concentrations of both copolymers of Examples I and II were made up and the cloud and pour points of the blends determined. The fuel oil employed in each case was No. 2 fuel (a 50/50 blend of water white distillate having an end point of 565 and light cycle oil derived by catalytic cracking of gas oils). For comparative purposes the cloud and pour points of blends containing only one of the additives and the fuel oil without the additives was also tested. The results are shown in Table I below:

TABLE I

| Percent By Weight | | No. 2 Fuel Oil System | |
|---|---|---|---|
| Copolymer A | Copolymer B (Concentration in No. 2 Fuel) | Pour Point, °F. | Cloud Point, °F. |
| 0.00 | 0.00 | −5 | + |
| 0.00 | 0.05 | −5 | +6 |
| 0.05 | 0.05 | −15 | 0 |
| 0.10 | 0.05 | −30 | +2 |
| 0.25 | 0.05 | −40 | +6 |
| 0.05 | 0.00 | −5 | +4 |
| 0.10 | 0.0 | −5 | +6 |
| 0.25 | 0.00 | −5 | +8 |
| 0.00 | 0.10 | −20 | +2 |
| 0.05 | 0.10 | −35 | +2 |
| 0.10 | 0.10 | −40 | +2 |
| 0.25 | 0.10 | −40 | +4 |

The data show that whereas the octadeceneisobutylene copolymer has pour and cluod point depressing properties the copolymer of N,N-dimethylaminoethyl methacrylate and lauryl methacrylate by itself has no pour or cloud point depressing properties. Addition of the latter copolymer to a fuel oil containing the octadeceneisobutylene copolymer, however, is shown to unexpectedly potentiate an enhanced pour and cloud point.

We claim:

1. A distillate hydrocarbon fuel composition of improved pour point consisting essentially of a distillate hydrocarbon fuel oil, a minor amount of an oil-soluble Copolymer A of a lower alkyl amino lower alkyl ester of a monoolefinic fatty acid of 3–4 carbon atoms and an alkyl ester of a monoolefinic fatty acid of 3–4 carbon atoms and having 10 to 20 carbon atoms in the alkyl ester group, said copolymer containing a basic amino nitrogen content of about 1–5% by weight and a minor amount of an oil-soluble Copolymer B of about 25–75% by volume of isobutylene and about 25–75% by volume of a normal alpha olefinic hydrocarbon of 8–20 carbon atoms, said second copolymer having a Staudinger molecular weight of about 1,000 to 20,000, said copolymer amounts being in each case sufficient to provide in combination an improved pour point.

2. The composition of claim 1 wherein the amount of Copolymer A is about 0.02 to 0.5% by weight and the amount of Copolymer B is about 0.02 to 0.5% by weight.

3. The composition of claim 2 wherein the amount of Copolymer A is about 0.1 to 0.3% by weight.

4. The composition of claim 3 wherein the amount of Copolymer B is about 0.05 to 0.25% by weight.

5. The composition of claim 1 wherein the ratio of Copolymer B to Copolymer A is about 1 to 3:1.

References Cited in the file of this patent

UNITED STATES PATENTS 2,534,095   Young   Dec. 12, 1950
2,892,785   Harle et al.   June 30, 1959